(12) United States Patent
Bellandi (10) Patent No.: US 11,407,122 B2
(45) Date of Patent: Aug. 9, 2022

(54) DOVETAIL TOOL CHANGER FOR INDUSTRIAL MANIPULATORS

(71) Applicant: GIMATIC S.r.l., Roncadelle (IT)

(72) Inventor: Giuseppe Bellandi, Roncadelle (IT)

(73) Assignee: GIMATIC S.R.L., Roncadelle (IT)

( * ) Notice: Subject to any disclaimer, the term of this patent is extended or adjusted under 35 U.S.C. 154(b) by 503 days.

(21) Appl. No.: 16/361,555

(22) Filed: Mar. 22, 2019

(65) Prior Publication Data
US 2019/0291281 A1 Sep. 26, 2019

(30) Foreign Application Priority Data

Mar. 22, 2018 (IT) .................... 102018000003869
Feb. 22, 2019 (IT) .................... 102019000002615

(51) Int. Cl.
   *B25J 15/04* (2006.01)
(52) U.S. Cl.
   CPC .................. *B25J 15/045* (2013.01)
(58) Field of Classification Search
   CPC ...... B25J 15/045; B25J 15/0408; F16B 5/004; F16B 5/0052; F16B 5/0072; F16B 5/008; F16B 5/0635; F16B 5/0642; F16B 5/0685; F16B 2/12; F16B 2/185
   See application file for complete search history.

(56) References Cited

U.S. PATENT DOCUMENTS

| | | | | |
|---|---|---|---|---|
| 4,057,294 A | * | 11/1977 | Krekeler | E02F 9/2816 299/102 |
| 4,324,027 A | * | 4/1982 | Burkhardt | B23Q 1/28 198/345.3 |
| 4,854,016 A | * | 8/1989 | Rice | A61G 13/101 24/495 |
| 6,032,706 A | * | 3/2000 | Lear | B27F 1/12 144/144.1 |

(Continued)

FOREIGN PATENT DOCUMENTS

| | | | | |
|---|---|---|---|---|
| DE | 10129553 A1 | * | 1/2003 | .......... B25J 15/0052 |
| DE | 202016003670 U1 | | 8/2016 | |
| FR | 1455903 A | | 10/1966 | |

OTHER PUBLICATIONS

Machine translation of DE10129553A1 (Year: 2003).*

(Continued)

*Primary Examiner* — Moshe Wilensky
*Assistant Examiner* — Kyle A Cook
(74) *Attorney, Agent, or Firm* — Volpe Koenig (57) ABSTRACT

A dovetail tool changer includes a first plate to be constrained to an external handling system, a second plate to be constrained to a tool and locking device to lock the second plate in the first plate. The second plate is insertable along a longitudinal direction in a pocket defined in the first plate, both plates have complementary cross sectional shapes and define a dovetailed coupling. The locking device includes at least one floating element movable between a lock position at which it exerts a thrust onto the second plate preventing (Continued)

disengagement thereof from the first plate, and an unlock position, at which the second plate can be separated from the first plate. The locking device includes at least one thrust element connected to the at least one floating element, which are together able to be displaced along a first direction in response to an exerted user force.

14 Claims, 7 Drawing Sheets

(56) References Cited

U.S. PATENT DOCUMENTS

| | | | |
|---|---|---|---|
| 6,250,080 B1 * | 6/2001 | Shelor | F02G 5/00 60/618 |
| 2003/0175075 A1 | 9/2003 | Garrison | |
| 2016/0363144 A1 * | 12/2016 | Hann | F16B 1/0071 |

OTHER PUBLICATIONS

ASS Maschinenbau GmbH, Overath, Germany, The catalog Oct. 2017 from ASS Maschinenbau GmbH (pp. 1-30) (http://ass-automation.com/katalog/english_new/index.html#p=U1).

* cited by examiner

DOVETAIL TOOL CHANGER FOR INDUSTRIAL MANIPULATORS

INCORPORATION BY REFERENCE

The present application claims benefit of Italian Patent Application No. 102018000003869, filed Mar. 22, 2018 and Italian patent Application No. 102019000002615, filed Feb. 22, 2019, the entire contents of both of which are incorporated by reference herein as if fully set forth.

FIELD OF THE INVENTION

The present invention refers to a dovetail tool changer of the type used to constrain tools (EOAT End of Arm Tooling) to robotic arms of industrial manipulators.

BACKGROUND

In the industrial automation sector, the use of robotic manipulators, for example motorized articulated arms which tools can be combined with to operate on the pieces to be manipulated or machined, is well known. Depending on requirements, the tool can be a gripper to grip the objects to be manipulated, pincers, a punch, a suction cup, etc.

In many cases manipulators are designed to mount interchangeable tools. In this case, devices acting as mechanical interface for the functional connection of tools to the respective manipulator are generally used. These tool changers are often identified by the term "quick changer".

In principle, the tool changers comprise a first portion that can be fixed to the robotic arm and a second portion that can be fixed to the tool. The first portion and the second portion can be reversibly constrained to each other, that is to say that the coupling of these two portions allows the tool to be anchored to the robotic arm and released therefrom.

These devices must not only guarantee the proper tool-manipulator coupling, but also allow a tool change as quick and risk-free as possible for the operators, while ensuring that the tool is not accidentally released when the robotic arm is active.

A particular type of tool changer consists of the so-called dovetail tool changers, which include two plates: a first plate intended to be constrained to a robotic arm—and thus defined robot-side plate—, and a second plate intended to be constrained to a tool—and thus defined tool-side plate. The tool-side plate has a dovetail cross-section. The robot-side plate has a cross-section that is substantially complementary to the cross-section of the tool-side plate; in particular, the robot-side plate defines a pocket into which the tool-side plate can be inserted by sliding on the insertion plane along a longitudinal insertion direction.

In other words, the two plates have conjugate shapes.

For sake of simplicity, hereinafter the robot-side plate will be called the first plate and the tool side plate will be called the second plate.

Due to the shape coupling between the two plates, the second plate cannot disengage the first plate by moving in a direction transversal to the longitudinal insertion direction, but can only engage and disengage the first plate by sliding along the insertion plane.

More specifically, we can identify a state defined as "open", in which the second plate is not constrained to the first plate, and therefore the tool is not constrained to the robotic arm, a state defined as "intermediate", in which the second plate is inserted into the first plate but is not locked—and therefore can slip out thereof together with the respective tool—and a state defined as "locked" in which the second plate is inserted into the first plate and is made integral thereto by locking means. The locked state corresponds to the tool having been correctly locked to the robotic arm.

For example, U.S. patent application publication No. 2003/0175075 describes a dovetail tool changer wherein the two plates are locked to each other by providing the first plate and the second plate with tooth sets that face each other when the tool changer is in the intermediate state, i.e. when the second plate is inserted into the first plate. When appropriate thrust means of the first plate are activated, these exert a side thrust on the second plate thus causing the two tooth sets to engage with each other so that the tool changer is brought to the locked state. Although this solution ensures optimal locking, it involves the drawback of requiring great clearance between the two plates when inserting the second plate into the first plate. In addition, the engagement of the two tooth sets causes minimal adjustments of the longitudinal position of the second plate with respect to the first plate.

The catalog 9/2015 from ASS Maschinenbau GmbH (page 12) describes a dovetail tool changer called "SWM" (http://ass-automation.com/katalog/english_new/index.html#p=U1). This device comprises locking clamps positioned on the first plate, at a side, and movable between a backward position, at which they do not exert pressure on the second plate, and a forward position, at which the pressure they exert on the second plate is sufficient to lock the latter in the first plate.

Almost all dovetail tool changers are equipped with locking clamps. Usually, the clamps are operated by adjustable handles that can be used by the operators. The clamps are independent of each other; therefore, the adjustable handles can be used independently of each other as well, and this results in the following major drawback: sometimes the operators do not tighten both locking clamps but just act on one of the two adjustable handles, because of haste or inattention. As a result, the tool changer is brought to the locked state, but the second plate is not safely locked in the first plate. In fact, a single clamp may not exert sufficient pressure on the second plate to keep it locked. The second plate can slip out of the first plate because of the movements of the robotic arm that can move very fast. This circumstance can cause the second plate and the tool anchored thereto to be accidentally disengaged, with obvious safety problems for the operators working around the robotic arm.

SUMMARY

The object of the present invention is therefore to provide a dovetail tool changer, easy to make and use, which in all conditions of use ensures that the second plate is effectively locked in the first plate.

In particular, the object of this invention is to provide a dovetail tool changer in which the locking means of the second plate do not require the use of two different adjustable handles.

Therefore, the present invention relates to a dovetail tool changer according to claim 1.

In particular, the tool changer comprises a first plate (robot side) which is intended to be constrained to an external handling system, such as a robotic arm, and a second plate (tool side) which is intended to be constrained to a tool. Preferably the second plate can be inserted along a longitudinal insertion direction into a pocket defined in the first plate. The first and second plates have complementary and conjugate cross sectional shapes, and define a dovetailed coupling.

The tool changer further comprises locking means to lock the second plate in the pocket of the first plate. The locking means comprise in turn at least one, and preferably only one, floating element preferably movable in the direction transversal to the longitudinal insertion direction, between a lock position at which it exerts a thrust onto the second plate and prevents the disengagement thereof with respect to the first plate, and an unlock position, at which the second plate can be separated from the first plate.

Advantageously, the locking means comprise at least one thrust element whose function is to exert a thrust onto the corresponding floating member in order to move the latter to the lock position. The thrust elements are all together (not separately or selectively) susceptible to be displaced along a first direction, and preferably along a first longitudinal direction, in response to a same force exerted by the user; in other words, the thrust elements preferably are displaced along a direction parallel to the insertion direction of the second plate into the first plate. The thrust elements are coupled to the floating element in such a way that the transversal position of the floating element depends univocally on the longitudinal position of the thrust elements.

The important advantage involved in this solution is that the second plate can be locked in the first one by simultaneously acting on all the thrust elements with a single force. Therefore, unlike the known technique, the user does not have to act on several adjustable handles, but with a single force he activates all the thrust elements that in turn push the floating element, or the floating elements if more than one, into the lock position, all at once.

Preferably, the movement of each floating element towards the respective lock position is countered by a spring or equivalent resilient element.

In the preferred embodiment, the tool changer is equipped with a single floating element extending along at least half the length of the first plate, and more preferably along the entire corresponding side of the first plate. In this case, a single floating element is activated by one or more thrust elements, which in turn can all be operated together by the user.

Preferably, the tool changer comprises an activating lever that can be moved by the user precisely in order to exert the force that causes the thrust element, or the thrust elements, to act on the floating element. In particular, the activating lever is movable by the user between a lock position, at which it holds the at least one thrust element in a first longitudinal position corresponding to the lock position of the at least one floating element, and an unlock position, at which it holds the at least one thrust element in a second longitudinal position corresponding to the unlock position of the at least one floating element.

Preferably, the activating lever has a cam profile, for example of irreversible type, active on the thrust element or the thrust elements.

In a first embodiment, the thrust elements are in abutment against the floating element along respective inclined planes. In this embodiment, there is only one floating element that is provided with two inclined planes, and there are two thrust elements each having an inclined plane arranged so that the two thrust elements move longitudinally closer or away to/from each other by the sliding of their own inclined plane along a corresponding inclined plane of the floating element.

Preferably, in this first embodiment, the two thrust elements are susceptible to move closer or away to/from one another depending on the position given by the user to the activating lever. When the activating lever is in the lock position, the thrust elements are in the respective close position and the floating element is in the lock position. When the activating lever is in the unlock position, the thrust elements are in the respective spaced position and the floating element is in the unlock position.

Preferably, in this first embodiment, the two thrust elements are slidingly and longitudinally mounted on at least one rod, and preferably on two rods, parallel to the longitudinal insertion direction. For example, at least one spring or an equivalent resilient element is fitted on the rods and interposed between the two thrust elements; the spring counters, by its compression, the movements of the two thrust elements as they move closer.

In a second embodiment, there is only one thrust element having a single inclined plane. In this embodiment too, the thrust element is in abutment against the floating element.

The thrust element moves longitudinally and slides as its inclined plane is along the inclined plane of the floating element. The thrust element moves longitudinally closer or away to/from the stop side of the first plate.

In this embodiment, the thrust element moves in response to the position given by the user to the actuating lever. When the actuating lever is in the lock position, the thrust element is in close position with respect to the stop side of the first plate and the floating element is in the lock position. When the activating lever is in the unlock position, the thrust elements is in distal position with respect to the stop side and the floating element is in the respective unlock position.

Preferably, at least one spring or equivalent resilient element counters the movement of the thrust element as it moves closer to the stop side.

Preferably, in all embodiments a slider is arranged between the actuating lever and the thrust element. The slider is countered by one or more resilient elements, such as springs or elastomeric elements. Preferably, the slider slides in an opposite groove obtained in the thrust element. The actuating lever is in abutment against the slider, preferably with a conjugate rolling surface.

In a third embodiment the thrust element, preferably only one, is not in abutment against the floating element but is connected thereto by at least one joint, and preferably by two joints, which allow the longitudinal displacements of the thrust element to be converted into transverse movements of the floating element. In practice the floating element, the thrust element and the two joints form all together a four-bar linkage in which the longitudinal movements closer or away to/from a stop side of the first plate are converted into transverse displacements of the floating element moving closer or away to/from the second plate.

In a fourth embodiment, the thrust element is positioned at the stop side of the first plate and is transversely movable with respect to the longitudinal insertion direction of the second plate into the first plate thus getting closer to or away from the left side of the first plate.

The thrust element is connected by means of an articulated lever to the floating element, which is positioned on the right side of the first plate, so that the locking element transversely moves closer or away to/from the second plate as a result of transverse movements of the thrust element.

Preferably, in all embodiments the floating element is equipped with a rigid or flexible tooth having a hooked end able to hook the edge of the second plate when the floating element is in the lock position.

Preferably, all embodiments are provided with a sensor that detects the position of the activating lever and sends a corresponding signal to an external control unit. For example, the sensor is of magnetic type.

All the described embodiments allow the user to lock the second plate in the first one by only one movement of the single activating lever, and—unlike conventional solutions—this allows safety to be improved, thus reducing the risk of accidentally releasing the tools from the manipulators.

In addition, the tool changer according to this invention is even easier to be used with respect to the solutions according to the known art, and requires less time to be activated.

BRIEF DESCRIPTION OF THE DRAWINGS

Further characteristics and advantages of the invention will be more evident from the review of the following specification of some preferred, but not exclusive, embodiments depicted for illustration purposes only and without limitation, with the aid of the attached drawings, wherein.

DETAILED DESCRIPTION OF THE PREFERRED EMBODIMENTS

Figure 1:
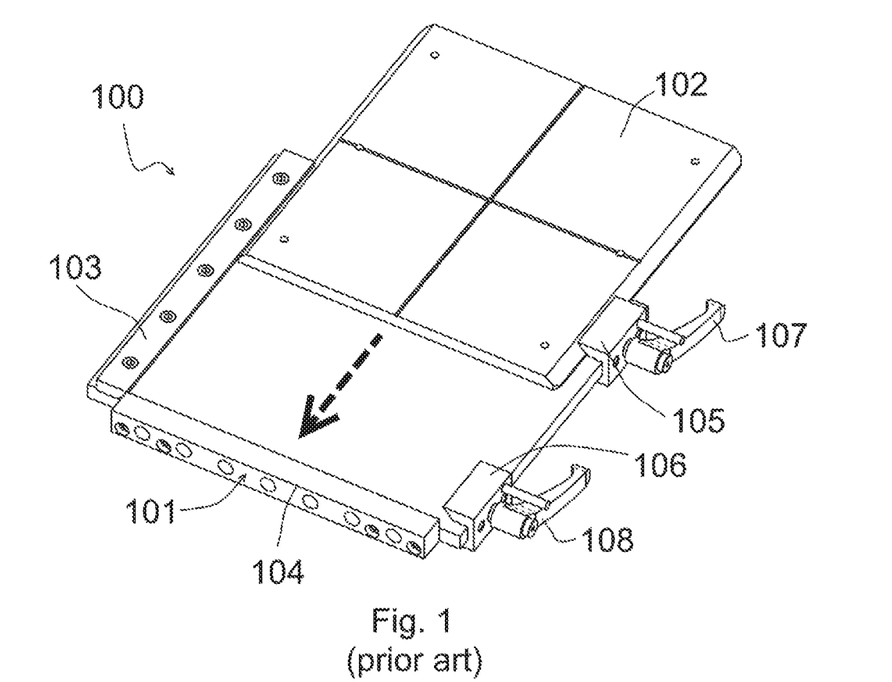
FIG. 1 is an isometric view of a dovetail tool changer according to the known art.

FIG. 1 shows a typical solution 100 according to the known art, comprising a first plate 101 intended to be fastened to a robotic arm, and a second plate 102 intended to support a tool, such as a gripper or a set of tools.

The second plate 102 has a dovetail cross section, i.e. it has tapered sides, and is shown partially inserted in the first plate 101. The insertion is carried out in the longitudinal direction depicted by the dotted arrow. The first plate 101 is equipped with a left side 103 acting as a shoulder, a stop element 104 against which the second plate 102 abuts when fully inserted, and two locking clamps 105 and 106 both positioned on the right side, i.e. opposite with respect to the left side 103.

The plate 101 and its attachments 103-106 define a pocket and the second plate 102 can be inserted therein and can be extracted therefrom. The second plate 102 and the pocket defined by the first plate 101 and by its attachments 103-106 have conjugate and complementary shapes.

The two clamps 105 and 106 can be moved along a direction orthogonal to the insertion direction of the second plate 102 into the first plate 101. In particular, the two clamps 105, 106 can be translated alternately between a forward position, at which they press on the second plate 102 thereby locking it in position, and a backward position, at which they do not exert pressure on the second plate 102, which is therefore free to disengage the first plate 101.

The two clamps 105 and 106 are manually operated by means of corresponding adjustment handles 107, 108 which in turn act on screws.

As mentioned above, the handles 107 and 108 are independently operated: therefore, a clamp 105 or 106 can be moved to the forward position where the second plate 102 is locked, when the other clamp 106 or 105 remains in the backward position where the second plate 102 is disengaged.

FIGS. 2-8 show a first embodiment of the tool changer 1 according to the present invention, comprising a first plate 2 and a second plate 3.

Figure 2:
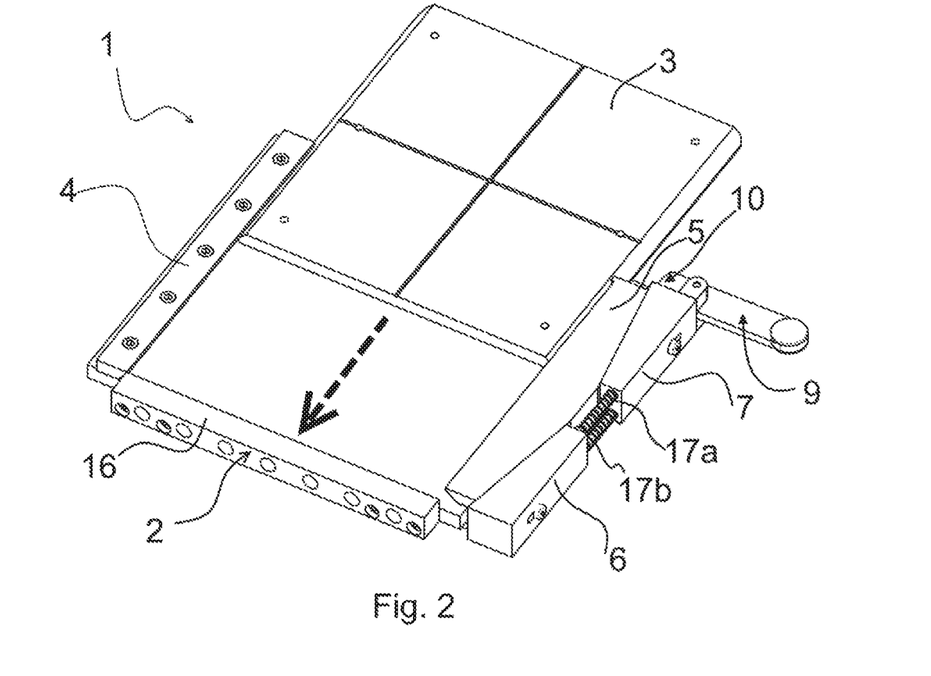
FIG. 2 is an isometric view of a first embodiment of the dovetail tool changer according to the present invention.

As shown in FIG. 2, the first plate 2 has a left side 4, a floating element 5 on the right side, i.e. on the opposite side with respect to the left side 4, and a front side which is opposite the rear side where the second plate 3 is inserted, the front side having a stop element 16 constrained thereto. In turn, the floating element 5 has a left side facing the plate 2 and an opposite right side. On the left side of the floating element 5 there is a groove whose shape is complementary to the right side of the first plate 2.

The first plate 2, the left side 4, the floating element 5 and the stop element 16 delimit the pocket into which the second plate 3 is inserted according to the longitudinal direction depicted by the dashed arrow. The second plate 3 has a dovetail cross section that is complementary to the section defined by the left side 4, the plate 2 and the floating element 5.

Figure 3:
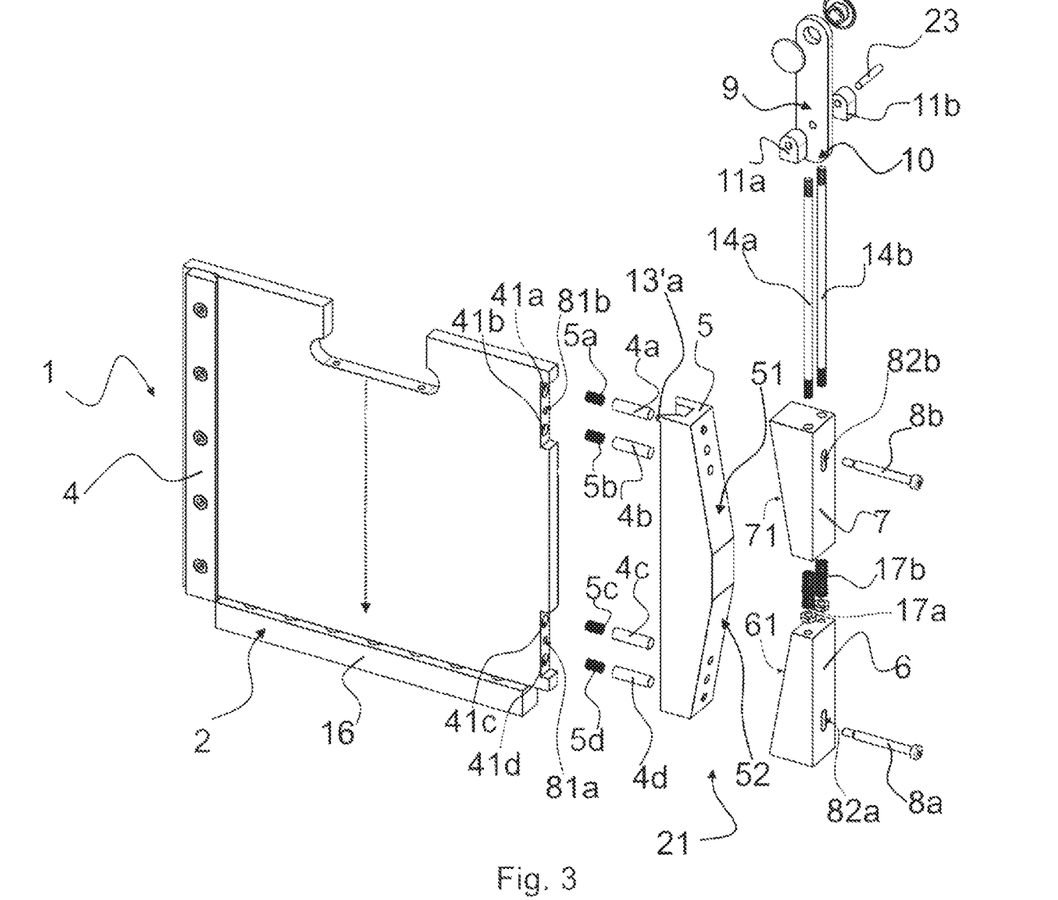
FIG. 3 is an exploded perspective view of the tool changer shown in FIG. 2.

As can be noted by considering FIG. 3, the floating element 5 therefore has two profiles in cross section: a first profile shaped like a groove in which the right side of the first plate 2 is received, and a second inclined profile, which is essentially complementary to the dovetail shaped, i.e. tapered, cross section of the second plate 3.

On the right side of the floating element 5 there are two inclined planes 51, 52, i.e. two surfaces not parallel to each other and not parallel to the left and right sides of the first plate 2.

In this first embodiment there are two thrust blocks 6, 7 each provided with an inclined plane 61, 71 intended to interact with one of the two inclined planes 51, 52 of the floating element 5. In particular the inclined planes 61, 71 of the thrust blocks 6, 7 are conjugate with a corresponding inclined plane 51, 52 of the floating element 5 and are intended to slide on them. The floating element 5 and the thrust blocks 6, 7 are components of the locking device and altogether are denoted by the reference 21.

As will be explained in more detail, the floating element 5 can move closer to the first plate 2 and away therefrom in response to the thrust exerted at any given time by the thrust blocks 6, 7 precisely because of the interaction between the inclined planes 61, 71 and the inclined planes 51, 52.

The right side of the first plate 2 allows at least two guide pins 4a-4d, and preferably four guide pins as shown in the figures, with corresponding springs 5a-5d to be housed by inserting them together in blind holes 41a-41d that are obtained at the right side of the first plate 2 and are orthogonal to the insertion direction of the second plate 3. Each guide pin 4a-4d is partially inserted in one of these blind holes 41a-41d and partially cantilevered protrudes towards the floating element 5. The springs 5a-5d are interposed between the guide pins 4a-4d and the bottom of the blind holes 41a-41d, and are designed to counter the displacements of the guide pins 4a-4d along the respective axis.

The end of the guide pins 4a-4d facing the floating element 5 is slidingly inserted in dedicated holes obtained in the left side of the floating element 5, so as to slidingly guide the latter when it is displaced as described above, i.e. as it is displaced closer to or away from the first plate 2. In other words, the floating element 5 is fitted on the guide pins 4a-4d and is movable thereon. Precisely because of this constraint and being susceptible to these movements, the element 5 is called floating.

Figure 5:
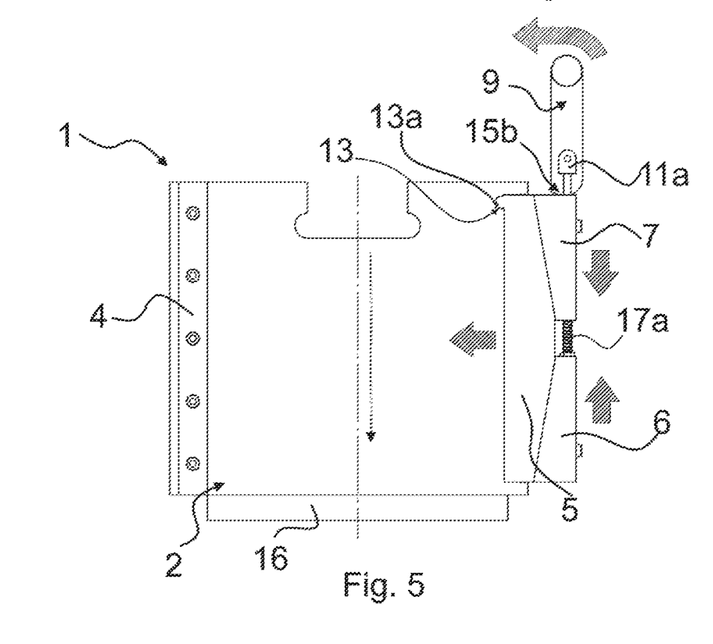
FIG. 5 is a plan view of the tool changer shown in FIG. 2, in a first configuration of use.
Figure 7:
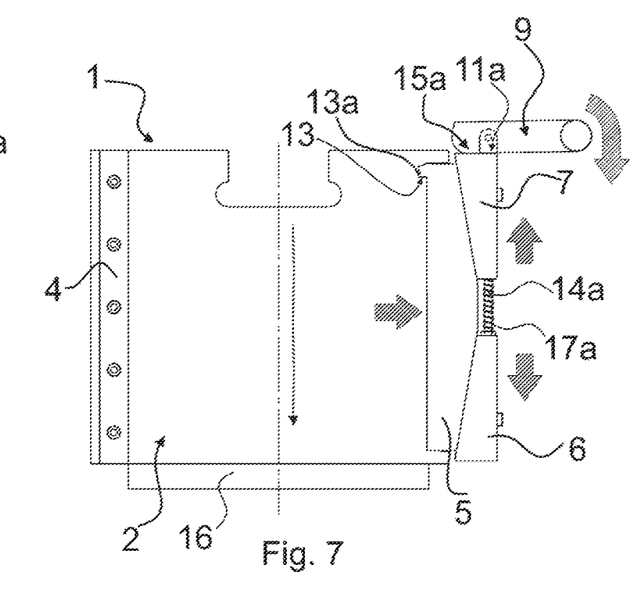
FIG. 7 is a plan view of the tool changer shown in FIG. 2, in a second configuration of use.

The floating element 5 is provided with a rigid tooth 13 shown in FIGS. 5 and 7, which protrudes from the left side of the floating element 5 and is provided with a hooked end 13a. The tooth 13 is integral with the floating element 5 and moves with it closer and away to/from the first plate 2. When the second plate 3 is inserted in the first plate 2 and the floating element 5 is in abutment against the former, the end 13a hooks the second plate 3 and prevents it from being possibly longitudinally released along the direction opposite the direction depicted by the dotted arrow.

Turning back to FIG. 3, it can be seen that both the thrust blocks 6, 7 are in turn slidingly mounted on at least one rod, and preferably on two rods 14a, 14b. In particular, the rods 14a, 14b pass through holes obtained in the thrust blocks 6, 7, so that each rod 14a, 14b is shared between the two thrust blocks 6, 7. The rods 14a, 14b are parallel to the insertion direction of the second plate 3. In addition, between the two thrust blocks 6, 7 there is at least one resilient element, such as for example a spring. In the example shown, two springs 17a, 17b are fitted each on one of the rods 14a, 14b.

When the tool changer 1 is correctly mounted, the two thrust blocks 6, 7 are movable along the rods 14a, 14b alternately in both ways along a first, substantially longitudinal, direction, so as to move closer to each other by overcoming the force of the springs 17a, 17b as a result of a force applied during activation, and to move away from each other, as a result of the thrust exerted by the springs themselves 17a, 17b.

The two rods 14a, 14b are threaded at the ends in order to allow the screwing of stop nuts, which prevent the thrust blocks 6, 7 from slipping out.

Figure 4:
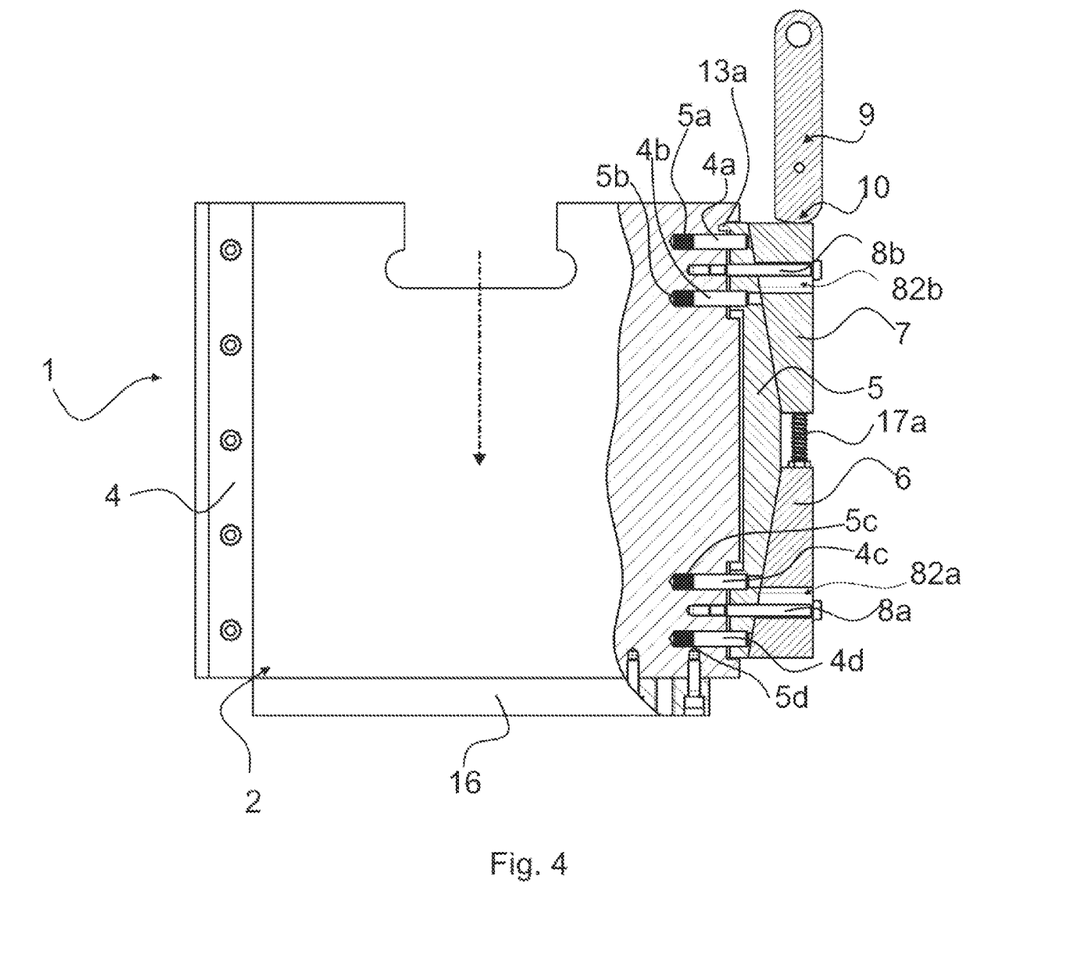
FIG. 4 is a plan, partially sectional view of the tool changer shown in FIG. 2.

The thrust blocks 6, 7 are also connected in a floating way to the first plate 2, preferably by means of the collar screws 8a, 8b shown in FIGS. 3 and 4. The collar screws 8a, 8b have a threaded end portion that meshes corresponding seats 81a, 81b obtained on the right side of the first plate 2, and an unthreaded portion that is between the threaded end portion and the collar and passes through the floating element 5, parallel to the lying plane of the first plate 2. The seat obtained in the thrust blocks 6, 7 and through which the collar screws 8a, 8b pass, is a slot 82a, 82b elongated in a direction parallel to the rods 14a, 14b, i.e. parallel to the insertion direction of the second plate 3, so as to allow the thrust blocks 6, 7 to move along said rods 14a, 14b, as explained above.

The thrust block 7 is in contact with the activating lever 9 that comprises a cam profile 10 and a pivot point at the pin 23, as shown in figures.

As shown in FIG. 3, the pin 23 is supported by two shoulders 11a, 11b that in turn are screwed to the ends of the rods 14a, 14b.

Paying attention to FIGS. 5 and 7, it can be noted that the actuating lever 9 and the thrust block 7 interact along the cam profile 10 that has a surface 15a proximal to the pin 23, and a surface 15b distal with respect to the pin 23. The terms proximal and distal are referred to the position of the surface 15a, 15b with respect to the axis passing through the shoulders 11a, 11b.

The cam profile 10 can interact with the thrust block 7 either along the surface 15a or along the surface 15b.

The above-described feature of the thrust blocks 6, 7 that alternatively move away from or closer to each other along the rods 14a, 14b depends on the position taken at a given time by the surfaces 15a, 15b of the cam profile 10 with respect to the interface interacting with the thrust block 7. When the surface 15a of the cam profile 10 comes into contact with the thrust block 7, the thrust blocks 6, 7 move away from each other by sliding on the rods 14a, 14b; when the surface 15b of the cam profile 10 comes into contact with the thrust block 7, the thrust blocks 6, 7 move closer to each other by sliding on the rods 14a, 14b.

This is due to the fact that the space available for the thrust blocks 6, 7 on such rods 14a, 14b changes depending on the surface of the cam profile 10 interacting with the thrust block 7.

In particular, as shown in FIG. 5, if the thrust block 7 interacts with the surface 15b of the cam profile 10, distal to the pin 23, the space along the rods 14a, 14b that is available for the thrust blocks 6, 7 decreases and, as a result, the thrust blocks 6, 7 move closer to each other; conversely, if the surface 15a of the cam profile 10 interacts with the thrust block 7, as shown in FIG. 7, the space available for the thrust blocks 6, 7 along the rods 14a, 4b increases and, as a result, the thrust blocks 6, 7 move away due to the thrust exerted by the springs 17a, 17b.

The operation of the first embodiment of the tool changer 1 is simple and will be explained hereinafter referring to FIGS. 5-8.

Once the second plate 3 has been inserted into the pocket located at the first plate 2, in the direction shown by the dotted arrow and as far as it abuts against the stop element 16, the actuating lever 9 is held by the operator and brought to the lock position to lock the second plate 3 to the first plate 2.

The cam profile 10 positioned on the actuating lever 9 is shaped so that the actuating lever 9 can switch from the unlock state to the lock state, and vice versa, only if operated by the operator, i.e. it is a profile of irreversible type.

Figure 6:
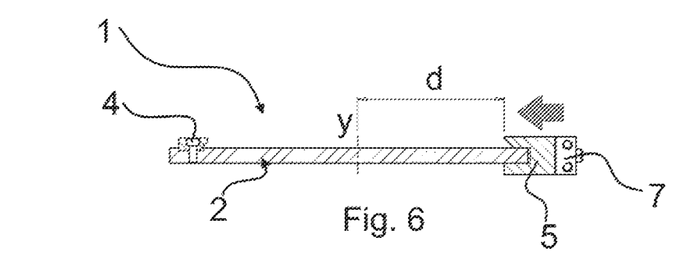
FIG. 6 is a cross sectional view of the tool changer shown in FIG. 2, in the first configuration of use visible in FIG. 5.

As shown in FIG. 5 and FIG. 6, in order to constrain the second plate 3 to the first plate 2, the operator pushes the actuating lever 9 in the direction depicted by the arrow, thus positioning it in the lock position, i.e. parallel to the insertion direction of the second plate 3 depicted by the dotted arrow.

This way the cam profile 10 interacts with the thrust block 7 along the surface 15b thereof, thereby causing the thrust blocks 6, 7 to be mutually displaced closer to each other along the rods 14a, 14b, as shown by the respective arrows. When the thrust blocks 6, 7, that are mounted so as to be floating with respect to the first plate 2, are displaced closer to each other, they cause a thrust on the floating element 5 by virtue of the sliding interaction between the inclined planes 61, 71 of the thrust blocks 6, 7 and the inclined planes 51, 52 of the floating element 5, so that the latter moves closer to the first plate 2, orthogonally to the direction depicted by the corresponding arrow.

Then, the floating element 5 is displaced closer to the first plate 2 by overcoming the countering force of the springs 4a-4d so that its left side, i.e. the side that comes into contact with the second plate 3, is positioned at a distance d with respect to the y-axis depicted in FIG. 6. In the example shown, this distance d is 117 mm. The floating element 5, positioned at such a distance d from the y-axis, exerts a thrust on the second plate 3 so that the latter is locked with respect to the first plate 2 and cannot slip out.

When the floating element 5 is in this lock position with respect to the second plate 3, the end 13a of the tooth 13 is in contact with the rear side of the second plate 3, i.e. with the side opposite the side that moves into abutment against the stop element 16, and prevents the second plate from being extracted in the direction opposite the direction depicted by the dashed arrow.

The floating element 5 is the only locking device that constrains the second plate 3 to the first plate 2 and its locking action takes place only after the actuating lever 9 is positioned in the lock position.

The second plate 3 is stably constrained to the first plate 2 and can only be separated when the operator brings the actuating lever 9 to the unlock position, in other words the force applied by the operator is required in order to bring the actuating lever 9 to the unlock position and make the second plate 3 separable from the first plate 2.

Figure 8:
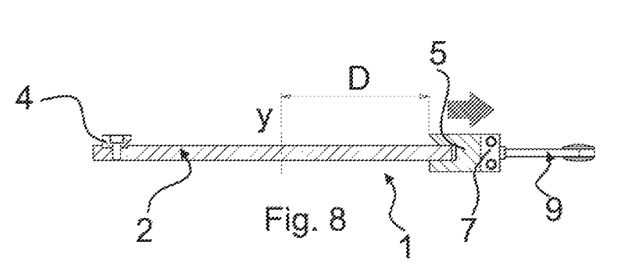
FIG. 8 is a cross sectional view of the tool changer shown in FIG. 2, in the second configuration of use visible in FIG. 7.

When the actuating lever 9 is brought to the unlock position shown in FIGS. 7 and 8, it is in contact with the thrust block 7 along the surface 15a of the cam profile 10, proximal to the axis passing through the pin 23, and it does not exert the thrust that allows the force exerted by the springs 17a, 17b on the thrust blocks 6, 7 and by the springs 4a-4d on the floating element 5 to be countered. Therefore, the thrust blocks 6, 7 move away from each other in the direction shown by the respective arrows in FIG. 7, as their respective inclined planes 61, 71 each slide on one of the inclined planes 51, 52 of the floating element 5.

When the actuating lever 9 is pushed into the unlock position, the floating element 5 moves away in an orthogonal direction with respect to the insertion direction of the second plate 3 and takes a position where its left edge is at a distance D with respect to the y-axis (FIG. 8), which in the example shown in figures is 119 mm, i.e. 2 mm greater than the distance d mentioned above.

When the floating element 5 is positioned at this distance D with respect to the y-axis, i.e. when it is in the unlock position with respect to the second plate 3, the end 13a of the tooth 13 is not in contact with the rear side of the second plate 3 and therefore does not prevent the operator from possibly extracting it in the longitudinal direction opposite that of the dashed arrow.

By moving the floating element 5 away from the first plate 2, the second plate 3 can be indeed unlocked from the first plate 2 and extracted therefrom in the longitudinal direction opposite that of the dashed arrow.

The locking device 21, comprising the floating element 5 and the thrust blocks 6-7, and the actuating lever 9 of the tool changer 1 described above can both be used to retrofit commercially available tool changer devices, for example the one shown in FIG. 1. For this purpose, the locking device 21 and the actuating lever 9 replace the locking means of the tool changer according to the known art, which in the example shown in FIG. 1 consist of two separate clamps 105, 106 operated by corresponding and distinct adjustable handles 107 and 108.

The first embodiment of the present invention 1 is not limited to the embodiment shown in FIGS. 2-8 and the corresponding description. The first embodiment of the present invention may comprise variations equivalent to that depicted in figure.

For example, a variation consists in prearranging the inclined planes of the thrust blocks 6, 7 according to angles opposite those shown in FIGS. 2-8, in order to obtain a kinematic reversal. By adopting inclined planes 61, 71 with reversed inclination, the lock and unlock positions of the activating lever 9 are reversed, but the operation of the device is conceptually unchanged.

FIGS. 9-13 show a second embodiment of the tool changer 1' according to the present invention, comprising a first plate 2' and a second plate 3.

Figure 9:
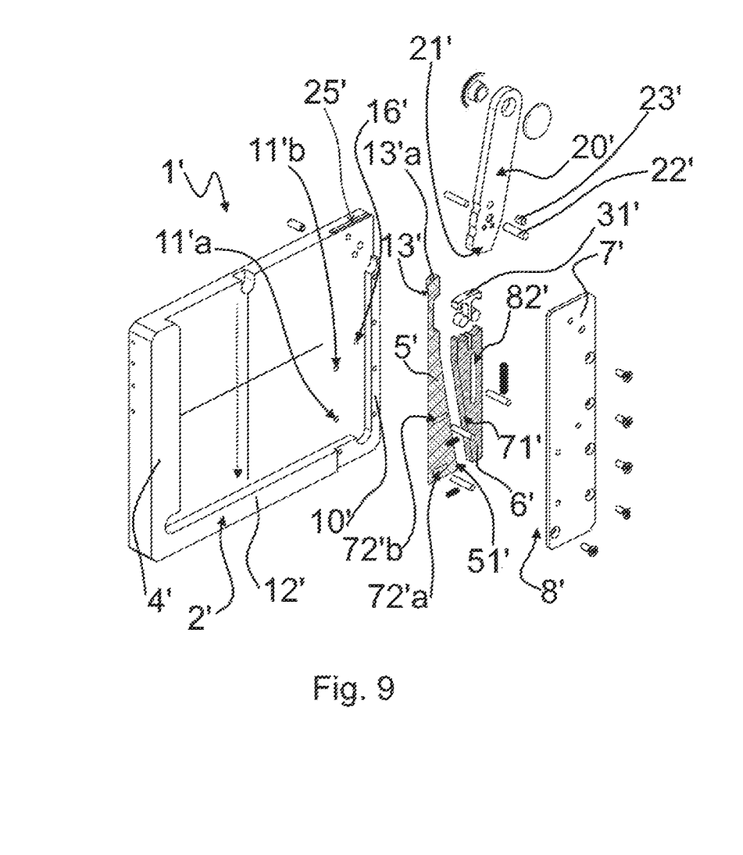
FIG. 9 is an exploded perspective view of a second embodiment of the tool changer according to the present invention.
Figure 10:
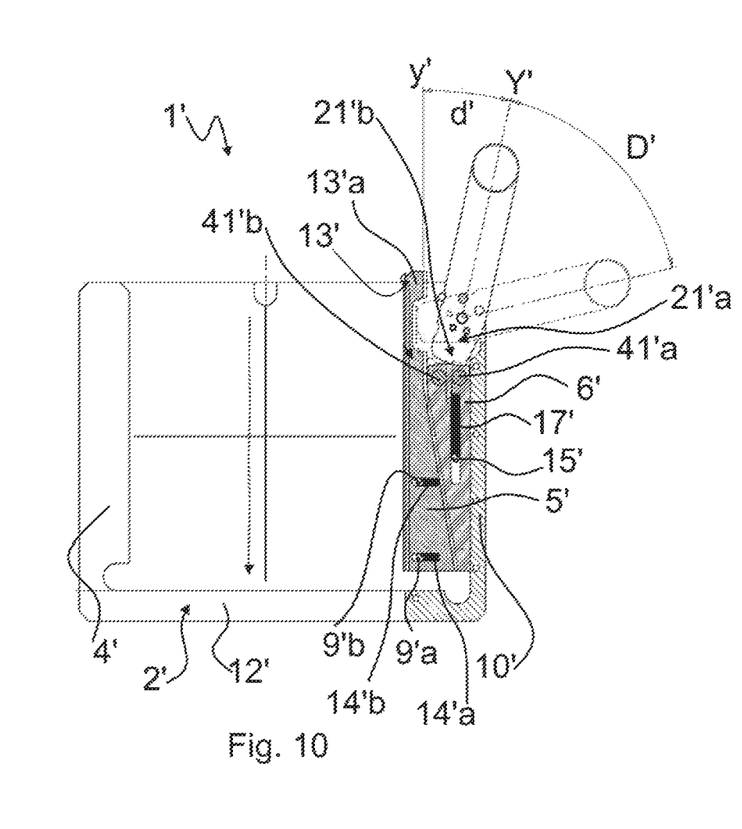
FIG. 10 is a plan, partially sectional view of the tool changer shown in FIG. 9.

Focusing the attention on FIGS. 9 and 10, it can be seen that, similarly to the first embodiment 1 previously described, the first plate 2' comprises a left side 4', a right side 10' opposite the side 4', and a stop side 12' opposite the side where the second plate 3 is inserted in the direction depicted by the dashed arrow.

At the right side 10' on the first plate 2' there is a locking device denoted by the reference number 8' on the whole and comprising a floating element 5', a thrust sheet 6' and a cover 7'.

The floating element 5' is in contact on its left side with the second plate 3, when the latter is inserted in the first plate 2', along a profile substantially complementary to the dovetail cross section of the second plate 3, and on its right side, that is the opposite the left side, is in contact with the thrust sheet 6'. The floating element 5' and the thrust sheet 6' have inclined planes 51' and 71', respectively, which are not parallel to the insertion direction of the second plate 3 depicted by the dashed arrow, and along which the floating element 5' and the thrust sheet 6' interact.

Said floating element 5' has at least one slot 72'a, and preferably two slots 72'a and 72'b extending over (passing through) the entire thickness of the floating element 5'. The slots 72'a, 72'b are elongated in the direction perpendicular to the insertion direction of the second plate 3.

A pin 9'a is inserted in each slot 72'a, 72'b, and preferably two pins 9'a and 9'b, which orthogonally intercept corresponding blind holes 11'a and 11'b that are obtained in the first plate 2'. Each slot 72'a and 72'b accommodates at least one resilient element, such as the two springs 14'a and 14'b; these springs 14'a and 14'b are arranged, as shown in FIG. 10, along the elongated side of the corresponding slots 72'a, 72'b perpendicularly to the insertion direction of the second plate 3, so that an end of each spring 14'a, 14'b is in contact with the pin 9'a, 9'b inserted in the corresponding slot 72'a, 72'b, and the other end is in contact with the surface on the right of the slot 72'a, 72'b, i.e. proximal to the thrust sheet 6'.

Figure 12:
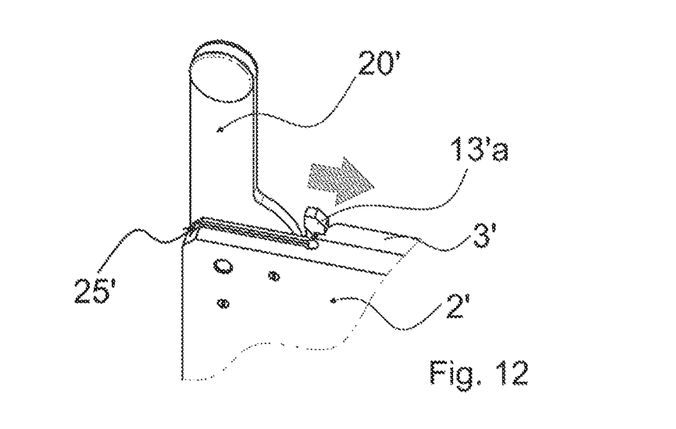
FIG. 12 is a perspective view of a detail of the tool changer shown in FIG. 9, in a first configuration.

The floating element 5' is provided with a tooth 13' that is positioned parallel to the left side of the floating element 5' and is equipped with a hooked end 13', which allows the second plate 3 to be hooked once said second plate 3 is completely inserted into the first plate 2' and the floating element 5' is in abutment against the second plate 3, as shown in FIG. 12.

As described hereinbefore, the thrust sheet 6' has its left side that comes into contact with the right side of the floating element 5' and its right side that comes into contact with the right side 10' of the first plate 2'.

The thrust sheet 6' also has a through slot 82'.

The slot 82' has a shape longitudinally elongated in a direction parallel to the insertion direction of the second plate 3 according to the direction shown by the dashed arrow; a pin 15' is inserted in said slot 82' and intercepts a corresponding blind hole 16' in the first plate 2'. The slot 82' receives at least one resilient element, such as the spring 17', which is arranged in the slot 82' parallel to the direction depicted by the dotted arrow so that an end of the spring 17' is in contact with the pin 15' and the other end of the spring 17' is in contact with the surface of the slot 82' distal to the stop side 12'.

The floating element 5' and the thrust sheet 6' are movably mounted on the first plate 2'.

This feature is due to the fact that the seat, in which the pins 9'*a*, 9'*b*, 15' are placed, are slots 72'*a*, 72'*b*, 82' elongated along a direction and allowing the movement of the floating element 5' and the thrust sheet 6' with respect to said pins 9'*a*, 9'*b*, 15', which instead remain stationary with respect to the first plate 2' in the respective blind holes 11'*a*, 11'*b*, 16'.

In particular, since the shapes of the slots 72'*a*, 72'*b* are transversally elongated, i.e. in a direction orthogonal to the insertion direction of the second plate 3, the floating element 5' can transversally move closer or away with respect to the second plate 3; on the other hand, since the shape of the slot 82' is longitudinally elongated, i.e. in a direction parallel to the insertion direction of the second plate 3, the thrust sheet 6' can longitudinally move closer or away with respect to the stop side 12'.

The floating element 5' and the thrust sheet 6' that move closer to the second plate 3 and the stop side 12, respectively, cause the respective springs 14'*a*, 14'*b*, 17' positioned in the corresponding slots 72'*a*, 72'*b*, 82' to be compressed, while when the floating element 5' and the thrust sheet 6' move away, their movement being guided by the force the respective springs 14'*a*, 14'*b*, 17' exert, during their extension, on the floating element 5' and the thrust sheet 6'.

When the thrust sheet 6' moves, it slides as its inclined plane 71' is along the inclined plane 51' of the floating element 5', and in contact therewith.

A cover 7' constrained to the right side 10' of the first 2' plate holds the floating element 5' and the thrust sheet 6' in the correct position, i.e. in the position that guarantees the proper operation of the tool changer 1'.

The portion of the thrust sheet 6' that is distal to the stop element 12' comes into contact with a slider 31' that is positioned at the interface between the thrust sheet 6' and the actuating lever 20' and forms, together with the distal profile of the thrust sheet 6', at least one seat, and preferably two seats, able to accommodate an elastomeric element, and preferably two elastomeric elements, such as the rubber elements 41'*a* and 41'*b* having the function of compensating for plays and tolerances of the entire kinematic mechanism and the second plate 3. The slider 31' slides into a hollow obtained in the thrust sheet 6'.

Figure 11:
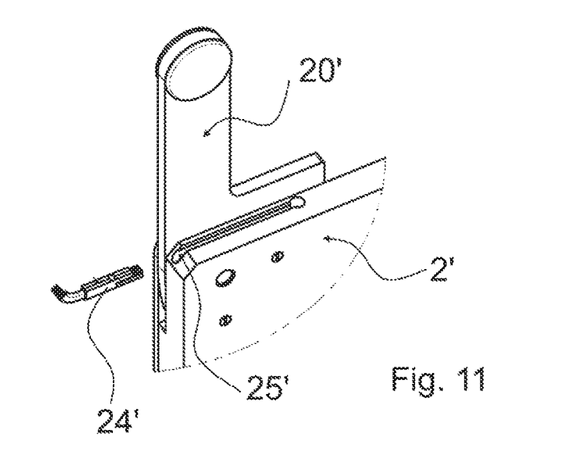
FIG. 11 is a perspective view of a detail of the tool changer shown in FIG. 9.

The actuating lever 20' comprises a cam profile 21', a pin 22' and an element, such as a magnet 23, which allows the operator to be informed whether the actuating lever 20' is in the locked or unlocked state by means of a sensor 24' that can be positioned in the groove 25' obtained in the first plate 2'.

The actuating lever 20' is constrained to the first plate 2' by means of a pin 22' and is in contact with the slider 31' along the cam profile 21'.

The cam profile 21' on the actuating lever 20' is an irreversible cam profile, i.e. it is shaped so that the actuating lever 20' can switch from the unlock position to the lock position, and vice versa, only if activated by the operator.

As previously described for the first embodiment of tool changer 1, the cam profile 21' has a proximal portion 21'*a* and a distal portion 21'*b*. The terms proximal and distal are chosen with reference to the position relative to the axis passing through the pin 22'.

The proximal portion 21'*a* and the distal portion 21'*b* of the cam profile 21' alternate in interacting with the slider 31' depending on the position of the actuating lever 20': when the actuating lever 20' is pushed into the lock position by the operator, in order to lock the second plate 3 to the first plate 2' then the distal portion 21'*b* of the cam profile 21' interacts with the slider 31'; on the other hand, when the actuating lever 20' is in the unlock position, in order to allow the second plate 3 to be extracted from the first plate 2', then the proximal portion 21'*a* interacts with the slider 31'.

Since the slider 31' is at the interface between the actuating lever 20' and the thrust sheet 6', the thrust given to the slider 31' by the actuating lever 20' is also transmitted to the thrust sheet 6'.

When the cam profile 21' interacts with the slider 31' along the distal portion 21'*b*, the cam profile 21' moves closer to the pin 15' and consequently pushes the thrust sheet 6' towards the stop side 12' up to the position in which the spring 17', by its compression, compensates for the thrust of the actuating lever 20'; on the contrary, when the cam profile 21' interacts with the slider 31' along the proximal portion 21'*a*, it moves away from the pin 15' so that the thrust sheet 6' can move away from the stop side 12' due to the thrust that the spring 17', which extends, exerts on the thrust sheet 6'.

The thrust sheet 6' moves away from or closer to the stop side 12' along a first direction, substantially parallel to the insertion direction of the second plate 3 and thus causes a displacement of the floating element 5' away from or closer to the second plate 3 in a direction orthogonal to the insertion direction of the second plate 3, due to the interaction of the floating element 5' and the thrust sheet 6' along their respective inclined planes 51' and 71'.

The second plate 3 is locked and unlocked on/from the first plate 2', depending on the position taken by the floating element 5' at the end of the displacement to get closer and away, respectively, with respect to said second plate 3.

Although the locking system of the tool changer 1' is efficient and can be activated simply by operating only the actuating lever 20', the device 1' can be equipped with some components to ensure greater safety in using the tool changer 1' and prevent the second plate 3 from accidentally slipping out of the first plate 2' during the operation of the robotic arm.

As previously described, the floating element 5' is equipped with a tooth 13' having a hooked end 13'*a* able to hook the second plate 3 when the floating element 5' exerts its locking action on the second plate 3, in order to prevent the second plate 3 from slipping out of the first plate 2' during the movement of the robotic arm.

Figure 13:
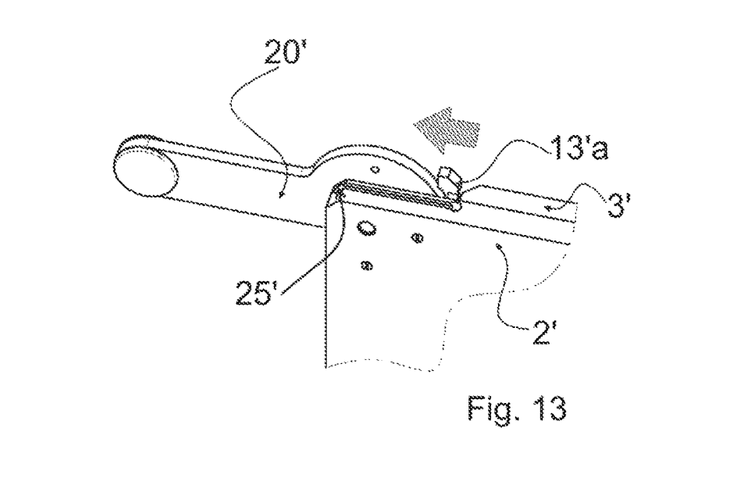
FIG. 13 is a perspective view of a detail of the tool changer shown in FIG. 9, in a second configuration.

FIGS. 12 and 13 show that when the actuating lever 20' is in the unlock position (FIG. 13), the hooked end 13'*a* of the tooth 13' does not hook the second plate 3 so that said second plate 3 can be extracted from the first plate 2'; by contrast, when the actuating lever 20' is in the lock position (FIG. 12), the end 13'*a* hooks the second plate 3 and prevents it from being accidentally released from the first plate 2' during the operation of the robotic arm.

Another component that guarantees the safe use of the tool changer 1' is the magnet-sensor control system that makes it possible to check whether the actuating lever 20' has actually been turned by the operator to the lock position before allowing the robotic arm to start its movements.

In fact, in the actuating lever 20' there is a magnet 23' whose position is different with respect to the sensor 24' inserted in the groove 25' of the first plate 2' (FIG. 11), depending on whether the actuating lever 20' is in the lock or unlock position.

If the actuating lever 20' is in the unlock position, the magnet 23' is spaced from the sensor 24' that does not detect it and does not allow the robotic arm to be started; on the contrary, if the actuating lever 20' is in the lock position, the magnet 23' is near the sensor 24' that detects it and allows the robotic arm to be started.

The operation of this second embodiment of the tool changer 1' is simple and will be explained hereinafter referring to FIG. 10.

FIG. 10 shows in solid lines the position of the components of the tool changer 1' when the actuating lever 20' is positioned by the operator in the lock position in order to lock the second plate 3 to the first plate 2'.

When the actuating lever 20' is turned to the lock position by an operator, it forms with the y' axis an angle d' that in the example shown in FIG. 10 is of 13°; said actuating lever 20' interacts with the slider 31' along the distal portion 21'b of the cam profile 21' and pushes the slider 31', and consequently also the thrust sheet 6', closer to the stop side 12'; the thrust sheet 6' is displaced closer to the stop side 12' up to the position in which the spring 17' compensates for the thrust of the actuating lever 20'.

The thrust exerted by the actuation lever 20' on the thrust sheet 6' is transferred to the floating element 5', due to the interaction the thrust sheet 6' and the floating element 5' have along the respective inclined planes 71', 51'; then, the floating element 5', due to the thrust exerted thereon by the thrust sheet 6', is displaced closer to the second plate 3 orthogonally to the insertion direction of the second plate 3 in the first plate 2', thereby causing the springs 14'a, 14'b to be compressed.

The floating element 5' is the only locking means that constrains the second plate 3 to the first plate 2' and exerts its locking action not only transversally, i.e. orthogonally to the insertion direction, but, through the hooked end 13'a of the tooth 13' the floating element 5' is equipped with, also longitudinally, i.e. parallel to the insertion direction of the first plate 3; in fact, as the floating element 5' moves closer towards the second plate 3, at the same time the hooked end 13'a moves closer to the second plate 3 and hooks the second plate 3, as shown by the arrow in FIG. 12, thereby preventing a possible accidental release of the second plate 3 from the first plate 2' during the operation of the robotic arm.

Once the actuating lever 20' has been positioned in the lock position, the floating element 5' constrains the second plate 3 to the first plate 2' at any given time and when the magnet 23' has been detected on the actuating lever 20' in the lock position by the sensor 24', the latter informs the control unit that allows the robotic arm to move.

The cam profile 21' of the actuating lever 20' is shaped so that it is required for the operator to turn the actuating lever 20' to the unlock position so that the second plate 3 becomes unconstrained from the first plate 2', in other words, the second plate 3 remains constrained to the first plate 2' until the operator positions the actuating lever 20' to the unlock position.

On the other hand, FIG. 10 shows in dotted lines the position of the components of the tool changer 1' when the actuating lever 20' is positioned by the operator in the unlock position, in order to unlock the second plate 3 from the first plate 2'.

When the actuating lever 20' is turned by an operator to the unlock position, it forms with the Y' axis an angle D' that in the example shown in FIG. 10 is of 64°; said actuating lever 20' interacts with the slider 31' along the proximal portion 21'a and does not exert any thrust either on said slider 31' or, consequently, on the thrust sheet 6'; in addition, the cam profile 21' is displaced to the distal position with respect to the pin 15', thereby allowing the thrust sheet 6' to move away from the stop side 12' by virtue of the thrust exerted by the spring 17' on the thrust sheet 6'.

The thrust sheet 6', while it is displaced away from the stop side 12' along a direction parallel to the direction of inserting the second plate 3 in the first plate 2', slides as its inclined plane 71' is along the inclined plane 51' of the floating element 5' and does not exert a thrust on the floating element 5' orthogonally to the insertion direction of the second plate 3; therefore, said floating element 5' can be displaced away from the second plate 3 by virtue of the force exerted on it by the springs 14'a, 14'b.

The floating element 5' is displaced away from the second plate 3 and no locking action is exerted thereon by the floating element 5', so that the plate 3 is no longer constrained to the first plate 2'. Moreover, due to the floating element 5' is displaced away with respect to the second plate 3, the end 13'a of the tooth 13', which the floating element 5' is equipped with, translationally moves away from the second plate 3, as shown by the arrow in FIG. 13, thus allowing the latter to be extracted from the first plate 2' in the opposite direction to that of the dashed arrow.

Once the actuating lever 20' has been positioned in the unlock position, the magnet 23' is not detected on the actuating lever 20' by the sensor 24' and the corresponding control unit does not allow the movement of the robotic arm on which the first plate 2' is present.

Figure 14:
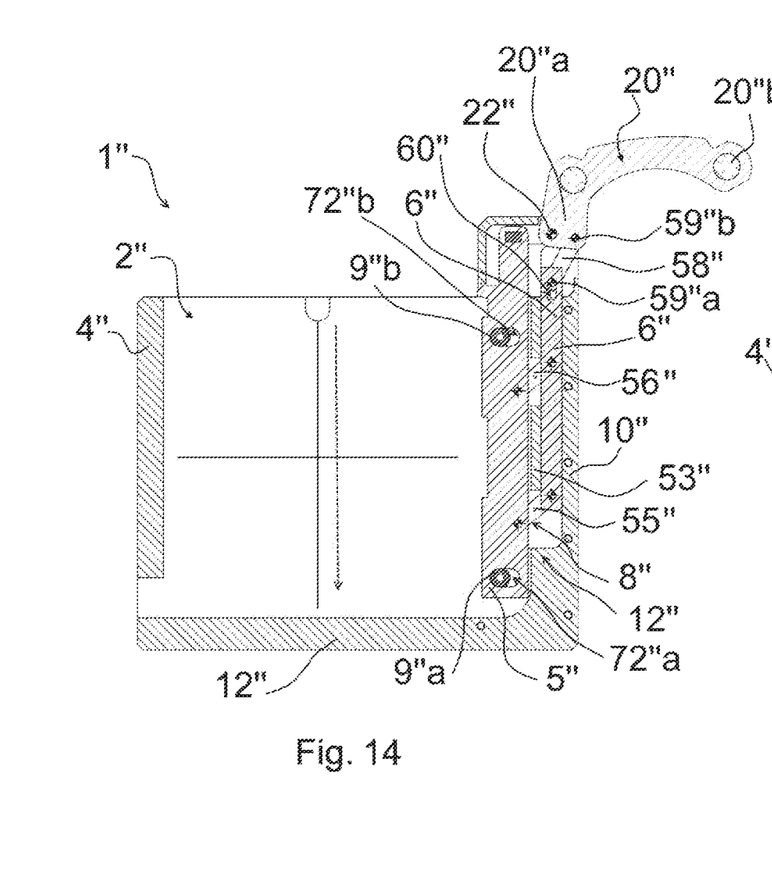
FIG. 14 is a plan view of a third embodiment of the tool changer shown according to the present invention, in a second configuration of use.
Figure 15:
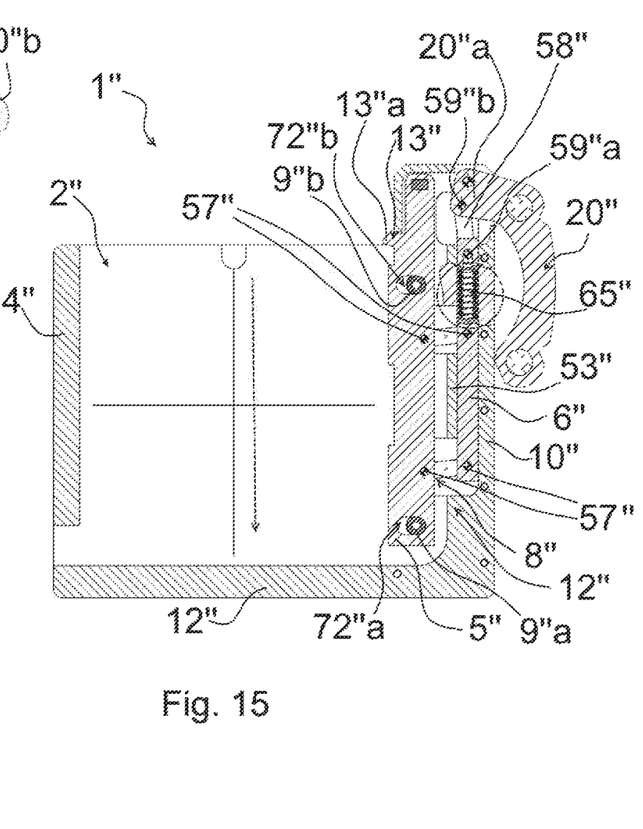
FIG. 15 is a plan, partially sectional view of the tool changer shown in FIG. 14, in a first configuration of use.

FIGS. 14 and 15 show a third embodiment of a dovetail tool changer 1" also comprising a first plate 2" and a second plate 3, which define a dovetailed coupling with each other.

Like the two embodiments described above, the tool changer 1" comprises a left side 4", a right side 10" opposite the side 4" and a stop side 12" which all together delimit a pocket in which the second plate 3 can be inserted along the direction depicted by the dashed arrow in FIGS. 14 and 15.

At the right side 10" of the first plate 2" a locking device 8" is provided, i.e. an assembly allowing the second plate 3" to be lock and unlocked, if necessary, to/from the first plate 2". In particular, the locking device 8" is configured as a four-bar linkage 8" comprising a floating element 5", a thrust sheet 6" and first and second joints denoted by the references 55" and 56" in FIG. 14.

The floating element 5" is susceptible to move closer or away with respect to the second plate 3 along a direction transversal with respect to the longitudinal insertion direction of the second plate 3. In other words, the floating element 5" is movable between a lock position, at which it is in abutment against the second plate 3, and an unlock position at which the floating element 5" is separated from the second plate 3 and allows the second plate 3 to be pulled out of the first plate 2".

The floating element 5" is fastened to the first plate 2" by means of pins or screws 9"a and 9"b at two slots 72"a and 72"b that have elongated shapes in transversal direction and are obtained in the floating element 5". The screws 9"a and 9"*b* only partially occupy the space defined by the slots 72"*a* and 72"*b* so as to allow the floating element 5" to transversely move on the first plate 2".

In fact, as shown in FIG. 14, when the floating element 5" is in the unlock position, i.e. separated from the second plate 3, the screws 9"*a* and 9"*b* occupy the portion of the slots 72"*a* and 72"*b* proximal to the second plate 3; on the other hand, when the floating element 5" is in the lock position as shown in FIG. 15, i.e. in abutment against the second plate 3, the screws 9"*a* and 9"*b* occupy the portion of the slots 72"*a* and 72"*b* distal with respect to the second plate 3.

The locking function of the floating element 5" with respect to the second plate 3 is carried out also by means of a tooth 13" provided with a hooked end 13"*a*, as depicted by the respective references in FIG. 15. The tooth 13" is formed on the left side of the floating element 5" at the side of the first plate 2" where the second plate 3 is inserted and extracted so that, when the floating element 5" is in lock position, the hooked end 13"*a* hooks the second plate 3 and helps to prevent the latter from being accidentally released.

As can be better appreciated in FIG. 15, the hooked end 13"*a* protrudes towards the pocket of the first plate 2" when the floating element 5" is in the lock position whereas it is retracted and not able to intercept the second plate 3 when the floating element 5" is in the unlock position, as shown in FIG. 14.

The floating element 5" is susceptible to transverse movements, as described above, in response to longitudinal movements of the thrust sheet 6" given in turn by an operator by means of an actuating lever 20", as will be described hereinafter.

The thrust sheet 6" is flanked on the left by a guide element 53" and, on the right, by the right side 10" of the first plate 2". In practice, the guide element 53" and the right side 10" define the space in which the thrust sheet 6" slides in a first direction between a distal position, shown in FIG. 14, and a proximal position, shown in FIG. 15, with respect to the stop side 12", the first direction in the embodiment described herein being the longitudinal direction parallel to the insertion direction of the second plate 3 into the pocket of the first plate 2".

In practice, the thrust sheet 6" alternately moves in the longitudinal direction in response to controls given by the operator via the actuating lever 20".

The thrust sheet 6" cannot move in the transverse direction due to the presence of the guide element 53" and the right side 10" of the first plate 2".

The tool changer 1" further comprises a resilient element, and in particular a spring 65" shown in FIG. 15 and arranged at the thrust sheet 6" and allowing the different widths of the second plate 3 insertable in the first plate 2" to be compensated for. In other words, second plates 3, even having different widths, can be inserted in the first plate 2" and the spring 65" ensures that the four-bar linkage 8", by means of the floating element 5", can always move into abutment on the inserted second plate 3.

As mentioned above, the thrust sheet 6" and the floating element 5" are connected by first and second joints 55" and 56" so as to form a four-bar linkage 8" that acts as a locking mechanism and allows the longitudinal movements of the thrust sheet 6" to be turned into transversal movements of the floating element 5".

In other words, the thrust sheet 6" is coupled to the floating element 5" by means of the joints 55", 56" having first ends fastened to the thrust sheet 6" and second ends fastened to the floating element 5" by means of pins or trunnions, which are denoted by the reference 57" in FIG. 15; these pins 57" allow the joints 55", 56" to rotate with respect to the pins 57" themselves in response to the longitudinal movements of the thrust sheet 6".

Before going into details of the operation of the four-bar linkage 8", it should be noted that the thrust sheet 6" is in turn connected to the actuating lever 20" by means of a third joint, denoted by the reference 58" in FIG. 14.

A first end of the third joint 58" is fastened to the thrust element 6" and a second end is fastened to the lever 20" by means of pins 59"*a* and 59"*b*. In particular, the pin 59"*a* is positioned at the thrust sheet 6" and is inserted in a slot, denoted by the reference 60" in FIG. 14 and longitudinally obtained in the thrust sheet 6". On the other hand, the pin 59"*b* is fastened to the actuating lever 20" at the first end portion 20"*a* thereof.

In turn, the actuating lever 20" is constrained to the first plate 2" by means of a pin 22" which also acts as pivot pin for the actuating lever 20".

In fact, the actuating lever 20" can be rotated by the operator between an unlock position, shown in FIG. 14, at which the first end portion 20"*a* is in distal position with respect to the stop side 12" and a lock position, shown in FIG. 15, at which the first end portion 20"*a* is in proximal position with respect to the stop side 12".

The actuating lever 20" further comprises a second end portion 20"*b* equipped with a magnet, not shown, which is intended to interact with a sensor, also not shown, positioned at the right side 10" of the first plate 2" and connected to an external control system.

In the light of this, the operation of the above-described four-bar linkage 8" can be better understood.

In fact, by focusing in the first instance on FIG. 14, it is possible to see that when the actuating lever 20" is in the unlock position, its first end portion 20"*a* is in distal position with respect to the stop side 12" of the first plate 2"; similarly, the thrust sheet 6" is also in distal position with respect to the stop side 12".

In this configuration, the floating element 5" is in the unlock position, i.e. not in abutment against the second plate 3, and in proximal position with respect to the thrust sheet 6".

As can be seen in FIG. 14, the second end portion 20"*b* of the actuating lever 20" is in distal position with respect to the right side 10" of the first plate 2" and therefore the magnet and the sensor described above do not interact with each other.

When the operator rotates the activating lever 20" from the unlock position to the lock position shown in FIG. 15, the pin 59"*a* urges the spring 65" that in turn pushes the thrust sheet 6". In fact, the spring 65" is arranged between the pin 59"*a* and the pin 57" inserted in the thrust element 6" so that the force exerted by the actuating lever 20" at the pin 59"*a* is transferred to the pin 57" inserted in the thrust element 6", thus causing the latter to be displaced to a position proximal to the stop side 12".

By moving towards the stop side 12", the thrust sheet 6" in turn causes the floating element 5" to be displaced to the lock position.

In fact, since the thrust sheet 6" is connected to the floating element 5" by the first and second joints 55" and 56" so as to form a four-bar linkage 8", the longitudinal movement of the thrust sheet 6" towards the stop side 12" causes the floating element 5" to be transversally displaced towards the second plate 3 as far as the former comes into abutment against the latter and locks it.

The final position taken by the components when the actuating lever 20" is fully rotated in the lock position is best shown in FIG. 15.

This figure shows that, precisely when the actuating lever 20" is in the lock position, the thrust element 6" is in proximal position with respect to the stop side 12" and the floating element 5" is in lock position, i.e. in abutment against the second plate 3".

In addition, the second end portion 20"b of the activating lever 20" is in abutment against the right side 10" of the first plate 2" and the magnet positioned on the activating lever is in proximal position with respect to the sensor; this way the sensor detects the magnet presence and sends a signal to an external control unit to signal that the activating lever 20" is in the lock position.

In this configuration, the hooked end 13"a protrudes towards the pocket defined by the first plate 2" in order to hold therein the second plate 3 and prevent the latter from being accidentally released.

To allow the second plate 3 to be unlocked it is sufficient to turn the actuating lever 20" to the unlock position thus returning the thrust sheet 6" to the distal position and the floating element 5" to the unlock position.

Even in a fourth embodiment not shown in the figures, the floating element is positioned at the right side of the first plate and is susceptible to alternating transverse movements between a lock position, at which it is in abutment against the second plate and keeps it locked in the first plate, and an unlock position at which it is separated from the second plate, which can then be pulled out of the first plate.

However, unlike the third embodiment, in the fourth embodiment described herein, the thrust sheet and the respective actuating lever are arranged at the stop side of the first plate, i.e. at the side against which the second plate moves into abutment when it is inserted into the pocket of the first plate.

Therefore, the thrust sheet, in response to controls given by the operator through the actuating lever, is susceptible to alternating movements along a first, substantially transversal, direction between a distal position with respect to the left side of the first plate and a proximal position with respect to the left side of the first plate.

The actuating lever is connected to the thrust sheet in the same way as described with reference to the tool changer 1"; in practice, the actuating lever is movable between an unlock position, at which it holds the thrust sheet in the distal position, and a lock position, at which it holds the thrust sheet in the proximal position.

In turn, the thrust sheet is connected to the floating element by means of articulated levers that transfer the alternating movements of the thrust sheet to the floating element.

In other words, the levers cause the alternating displacements in the transverse direction of the thrust sheet to be turned into alternating movements in the transverse direction of the floating element.

In practice, the thrust sheet can be moved between a position distal with respect to the left side of the first plate, at which it holds the floating element in the unlock position, and a position proximal with respect to the left side, at which it holds the floating element in the lock position, i.e. in abutment against the second plate.

The embodiments described hereinbefore allow the second plate to be locked in the first plate by a single external force.

In other words, unlike what is described referring to the tool changer 100 of the known art, which is equipped with two distinct adjustable handles 107, 108 to lock and unlock the second plate to/from the first one, the tool changers 1, 1', 1" are equipped with a single actuating lever 9, 20', 20" that locks and unlocks the second plate and allows to simultaneously activate the thrust element, or the thrust elements, and the floating element by a single external force.

In particular, the tool changer 1", compared to the tool changers 1 and 1', allows the transmission of movement between the thrust element, i.e. the thrust sheet, and the floating element to be improved. In fact, in the case of the tool changers 1 and 1', the thrust elements are in abutment against the floating element and the transmission of the movement is carried out by sliding one on the other the respective inclined planes, whereas in the tool changer 1" the thrust element is not in abutment against the floating element but is connected thereto by two joints.

This limits friction between these components, facilitates the operations for locking and unlocking the second plate in/from the first plate, and minimizes wear on the thrust element and the floating element.

The invention claimed is:

1. A dovetail tool changer, comprising:
a first plate configured to be constrained to an external handling system;
a second plate configured to be constrained to a tool;
wherein the second plate is insertable into a pocket defined in the first plate, and wherein the first plate and the second plate have complementary shapes in cross section and define a dovetailed coupling,
a locking device, which locks the second plate in the pocket of the first plate, the locking device comprises at least one floating element movable between a lock position, at which the at least one floating element exerts a thrust onto the second plate and prevents disengagement thereof with respect to the first plate, and an unlock position, at which the second plate can be separated from the first plate,
wherein the locking device comprises at least one thrust element coupled to said at least one floating element and configured to be displaced along a first direction in response to an outer force exerted by a user,
wherein the position of the at least one floating element with respect to the second plate depends on the position taken by the at least one the thrust element along said first direction, and wherein the at least one thrust element is connected to the floating element by at least one joint which converts displacements of the at least one thrust element moving along a first longitudinal direction towards or away from a stop side of the first plate into transversal displacements of the floating element towards or away from the second plate.

2. The tool changer according to claim 1, wherein the second plate is insertable into the pocket defined in the first plate along a longitudinal insertion direction, which is substantially parallel to said first longitudinal direction and wherein the at least one floating element is movable along a direction transversal to said longitudinal insertion direction.

3. The tool changer according to claim 1, wherein the at least one floating element is only one and extends along at least half of a length of the first plate or substantially along an entire length thereof.

4. The tool changer according to claim 1, wherein at least one resilient element counters movement of the at least one floating element towards the respective lock position.

5. The tool changer according to claim 1, further comprising a resilient element, that guides displacements of the thrust element and compensates for any dimensional tolerances of the second plate.

6. The tool changer according to claim 1, wherein the at least one floating element is provided with a tooth having a hooked end configured to hook the second plate when the at least one floating element is in the lock position.

7. The tool changer according to claim 1, wherein said at least one joint are first and second joints and are fastened to the thrust element and to the floating element by pins.

8. The tool changer according to claim 7, wherein the thrust element, the floating element, the first joint and the second joint together form a four-bar linkage and wherein when an activating lever is in a lock position, the thrust element is in a proximal position with respect to the stop side and the floating element is in the lock position, and when an activating lever is in an unlock position, the thrust element is in a distal position with respect to the stop side and the floating element is in the respective unlock position.

9. The tool changer according to claim 7, further comprising an activating lever and a third joint connecting the activating lever to the thrust element and wherein, when the activating lever is in a lock position, the thrust element is in a proximal position with respect to the stop side and the floating element is in the lock position, and when the activating lever is in an unlock position, the thrust element is in a distal position with respect to the stop side and the floating element is in the respective unlock position.

10. The tool changer according to claim 1, comprising an activating lever movable by the user between a lock position, at which it holds the at least one thrust element in a first longitudinal position corresponding to the lock position of the at least one floating element, and an unlock position, at which it holds the at least one thrust element in a second longitudinal position corresponding to the unlock position of the at least one floating element.

11. The tool changer according to claim 10, wherein the activating lever has an irreversible cam profile.

12. The tool changer according to claim 10, further comprising a sensor that detects a position of the activating lever and sends a corresponding signal to an external control unit.

13. The tool changer according to claim 10, wherein between the activating lever and the thrust element there is a slider sliding in a dedicated seat of the thrust element.

14. The tool changer according to claim 13, wherein the slider and the thrust element define at least one seat in which at least one elastomeric element is housed.

* * * * *